United States Patent Office
2,749,254
Patented June 5, 1956

2,749,254

PROTECTIVE COATING METHOD

John A. Slyh, James F. Lynch, and Roger J. Runck, Columbus, Ohio, assignors, by mesne assignments, to Battelle Development Corporation, Columbus, Ohio, a corporation of Delaware No Drawing. Application April 22, 1952,
Serial No. 283,756

2 Claims. (Cl. 117—46)

This invention relates to protective coatings. More particularly, it relates to a hard surfaced coating formed on the surface of graphite which prevents oxidation of the graphite when it is exposed to elevated temperatures.

It is frequently desirable to use graphite bodies under conditions in which these materials are exposed to temperatures higher than 1000° F., as, for example, in heating elements and furnace chambers. However, it is known that in the presence of oxygen at elevated temperatures the surface of the graphite oxidizes and erodes away. Continued exposure results in the ultimate oxidation of the entire graphite body.

Many attempts have been made to prevent this oxidation of graphite bodies. For example, sodium silicate and silicon carbide have been used to form protective coatings. "Self-glazing" bodies have been formed in which the graphite is combined with ferro-manganese materials or silicon carbide. When heated, the graphite at the surface of the body oxidizes and the remaining substances form a protective glaze.

It has now been found that if a dispersion of molybdenum disilicide in a resin vehicle is applied to the surface of a graphite body, the resultant coating will protect the graphite from oxidation.

It is, accordingly, one of the objects of this invention to provide a protective coating for graphite.

A further object is to provide a graphite body resistant to oxidation at temperatures in excess of 1000° F.

Another object is to provide an adherent protective coating for a graphite body.

Other objects and advantageous features will be apparent from the following description.

In general, this invention comprises the formation of a coating mixture by suspending molybdenum disilicide in a resin vehicle. The coating mixture is applied to the surface of a graphite body, covering the portions to be protected. When the liquid coating has hardened, the coated body is then matured in an oxygen-free atmosphere.

No particular treatment is necessary to prepare the graphite surface for coating, although it may be desirable to clean the surface. The graphite surface may be rough or polished, and machining does not appear to affect the product.

The molybdenum disilicide powder is ground to a fineness of minus 200 mesh and mixed with a solution of a thermosetting, water-soluble, phenolic resin in water to form a dispersion. Phenol formaldehyde, phenol furfural, and methyl cellulose-type resins have been used with satisfactory results. Particularly good results are obtained, however, with resins of the phenol-formaldehyde type. It is necessary that the resin furnish from about 2 to 8 per cent carbon upon decomposition, as will be hereinafter explained. An optimum carbon percentage is 5 per cent.

The molybdenum disilicide dispersion may be applied to the graphite base by brushing, dipping, spraying, or similar methods. It has been found that soaking the graphite body in water prior to coating will result in a smoother, better-appearing coated surface. The coated base is then heated to a temperature of about 250 to 350° F. to cure the resin. The exact temperature and time for curing will depend on the resin used, but should be sufficient to remove the water and to polymerize the resin so as to harden the coating for subsequent maturing.

The specimen is then heated in an oxygen-free atmosphere at a temperature of about 3900 to 4100° F. to form the final coating. As the temperature of the specimen rises during this heating stage, the resin decomposes and carbon is dispersed in the molybdenum disilicide. At a temperature of about 3200° F., the molybdenum disilicide melts and takes into solution the dispersed carbon. At the temperature range of 3900 to 4050° F., a reaction takes place to form a stable complex system. This temperature is maintained until the reaction is complete and a hard coating has formed. The amount of time required to complete the reaction will vary with the size of the piece, temperature, etc.

The temperature range of 3900 to 4100 is critical. If the temperature remains below 3900° F., the reaction is not complete. If the temperature is maintained above about 4100° F., the complex system becomes unstable, losing silicon by vaporization.

The resulting coating protects the graphite at surface temperatures up to 3700° F. in a highly oxidizing atmosphere. Under similar conditions an unprotected graphite body is completely consumed.

As a specific example of this invention, a dispersion was formed by mixing 79.4 per cent molybdenum disilicide powder, ground to minus 200 mesh, with 7.6 per cent of "79 L, Low Solids," a thermosetting, water-soluble, phenolic resin, and 13.0 per cent water. The proportions were all by weight. The dispersion was painted on a clear surface of a graphite body. The painted specimen was air-dried and heated at 350° F., in an electric oven for 30 minutes, to set the resin binder. The specimen was then heated in an argon atmosphere for 10 minutes at a temperature of from 3900 to 4000° F. On cooling, it was noted that the painted surface had been converted to a dense adherent glaze.

The specimen was then subjected to blasts of hot, high-velocity, oxidizing gases. There was no evidence of any break-through of the coating after 12 cycles of 30-second firings. During this test the temperature of the coating rose to about 3600° F. The same test was made on an uncoated graphite body, and the specimen was essentially consumed by oxidation and erosion.

In summary, there has been herein disclosed a process and a coating composition for protecting graphite surfaces at elevated temperatures, wherein a molybdenum disilicide coating has been intimately bonded to a graphite surface.

Although a specific example has been given of the invention, it is not intended to be limited thereby, but only by the cope of the following claims.

What is claimed is:

1. The process of forming a protective coating on a graphite surface comprising the addition to an aqueous solution of a water-soluble organic compound selected from the group consisting of a phenolic resin and methyl cellulose, of molybdenum disilicide powder, applying the resultant dispersion to said graphite surface, and thereafter heating in an oxygen-free atmosphere to a temperature of from 3900 to 4100° F.

2. The process of forming a protective coating on a graphite surface comprising the addition to an aqueous solution of a water-soluble organic compound selected from the group consisting of a phenolic resin and methyl cellulose, said water-soluble organic compound being present in amounts sufficient to provide from 2 to 8 per cent free carbon upon decomposition, of molybdenum disilicide powder, applying the resultant dispersion to said graphite surface, heating to a temperature to decompose said water-soluble organic compound, and further heating to a temperature of from 3900 to 4100° F.

References Cited in the file of this patent

UNITED STATES PATENTS

| | | |
|---|---|---|
| 1,856,680 | Williams et al. | May 3, 1932 |
| 1,965,243 | Kneip | July 3, 1934 |
| 2,224,724 | Elsey | Dec. 10, 1940 |
| 2,282,098 | Taylor | May 5, 1942 |